United States Patent [19]
Powell et al.

[11] Patent Number: 5,842,501
[45] Date of Patent: Dec. 1, 1998

[54] PILOT OPERATED SAFETY RELIEF VALVE

[75] Inventors: Walter W. Powell, Sugar Land, Tex.; Michael L. Cognevich, Hamburg, N.Y.

[73] Assignee: Flow Safe, Inc., Orchard Park, N.Y.

[21] Appl. No.: 853,244

[22] Filed: May 9, 1997

Related U.S. Application Data

[63] Continuation-in-part of Ser. No. 701,830, Aug. 23, 1996.

[60] Provisional application No. 60/035,952 Jan. 22, 1997.

[51] Int. Cl.⁶ .................................................. F16K 31/12
[52] U.S. Cl. ............................................ 137/489; 137/492
[58] Field of Search .................................. 137/489, 488, 137/492, 493, 599

[56] References Cited

U.S. PATENT DOCUMENTS

| | | |
|---|---|---|
| 221,194 | 11/1879 | Scovell . |
| 474,711 | 5/1892 | Allan . |
| 489,515 | 1/1893 | Wood . |
| 923,568 | 6/1909 | Nicola . |
| 1,890,472 | 12/1932 | Temple . |
| 2,599,197 | 6/1952 | Prescott . |
| 3,429,337 | 2/1969 | Raymond . |
| 3,522,817 | 8/1970 | Raymond ................................ 137/489 |
| 4,172,466 | 10/1979 | Pattarini ................................. 137/489 |
| 4,362,183 | 12/1982 | Richter .................................. 137/489 |
| 4,402,341 | 9/1983 | Reip ...................................... 137/489 |
| 4,425,938 | 1/1984 | Papa ...................................... 137/489 |
| 4,615,356 | 10/1986 | Reip . |
| 4,870,989 | 10/1989 | Bickford ................................ 137/489 |
| 5,050,635 | 9/1991 | Tetsuka ................................. 137/489 |
| 5,555,910 | 9/1996 | Powell ................................... 137/489 |

OTHER PUBLICATIONS

Crosby Valve & Gage Company, *Crosby JPV Series Pilot Operated Pressure Valves*, Catalog No. 318, p. 9, USA.
Axelson USI Brochure, *Safomax Type F Safety Valves*, USA.
Axelson *Pilot Operated Pressure Relief Valve Type HL*.

*Primary Examiner*—Denise L. Ferensic
*Assistant Examiner*—Ramyar Farid
*Attorney, Agent, or Firm*—Bush, Riddle & Jackson L.L.P.

[57] ABSTRACT

A pilot operated safety relief valve assembly including a main safety relief valve (14) and a pilot valve (36) connected directly to the relief valve (14) is disclosed. Main safety relief valve (14) has a planar mounting face (76) in contact relation with opposed mating mounting face (78) of the pilot valve (36). Dome ports (72 and 84) in contacting planar faces (76, 78) are in alignment with each other without any tubing therebetween. Exhaust ports (74 and 86) in contacting planar faces (76, 78) are in alignment with each other without any tubing therebetween. Inlet sensing ports (75D, 75E, 65D, 65E) as shown in the embodiments of FIGS. 9 and 10 in contacting planar faces (76D, 76E, 78D, 78E) are in alignment with each other without any tubing therebetween. A fluid pressure pickup fitting (48) has a port (118) which communicates with the fluid passage (50) to the pressure vessel. A test connection (120) is connected to the fluid pressure pickup fitting (48). A shuttle valve (122) permits the pilot valve (36) to be responsive to the fluid pressure in inlet fluid passage (50) at all times. An embodiment of FIGS. 4–6 provides a back flow preventer shuttle valve (121A) in pilot valve body (38A) which blocks inlet fluid flow from inlet fluid passage (100A) to the main valve dome passage (72A) to prevent opening of the main valve member when fluid pressure in the main valve outlet chamber (52A) is higher that the fluid pressure in the fluid inlet passage (100A).

11 Claims, 6 Drawing Sheets

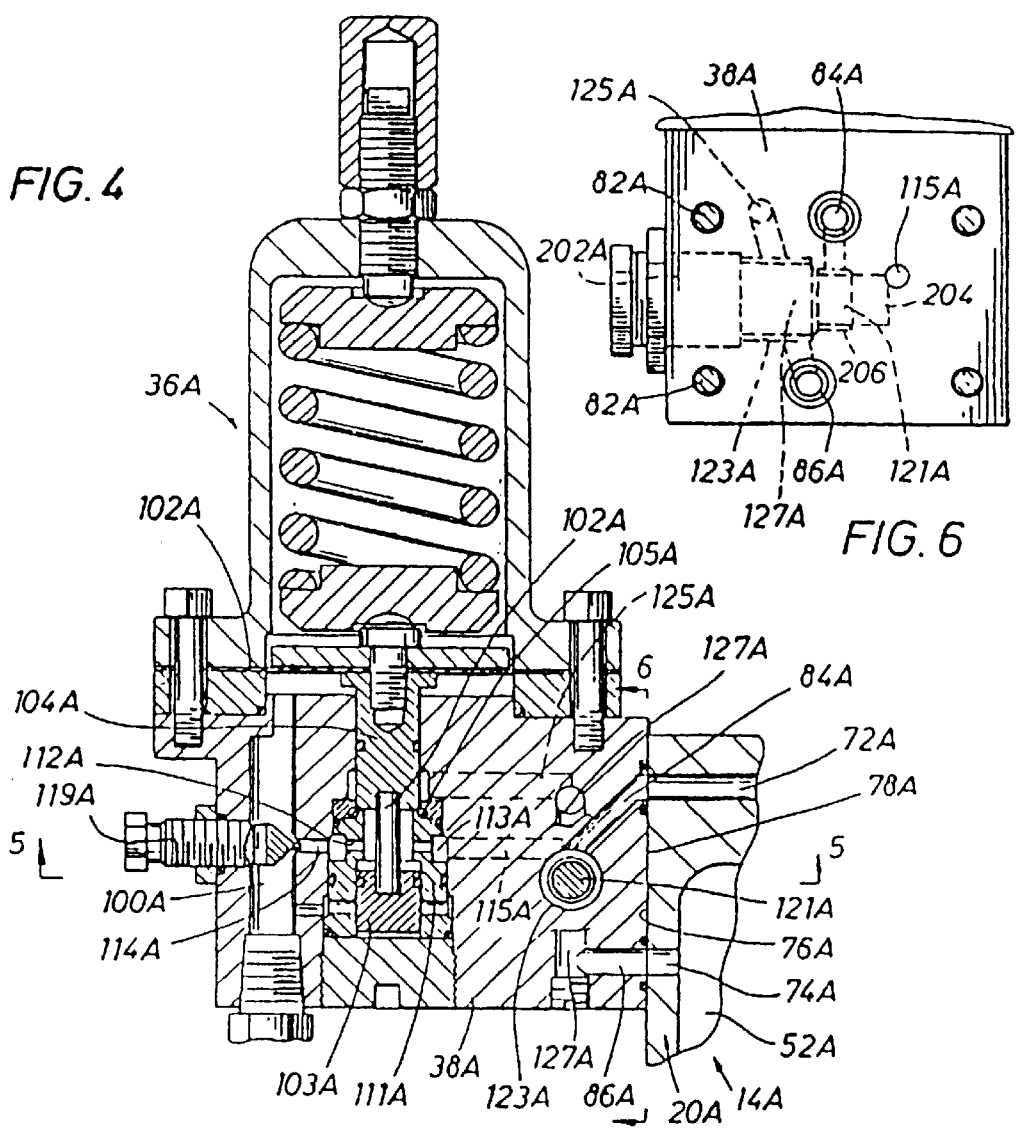
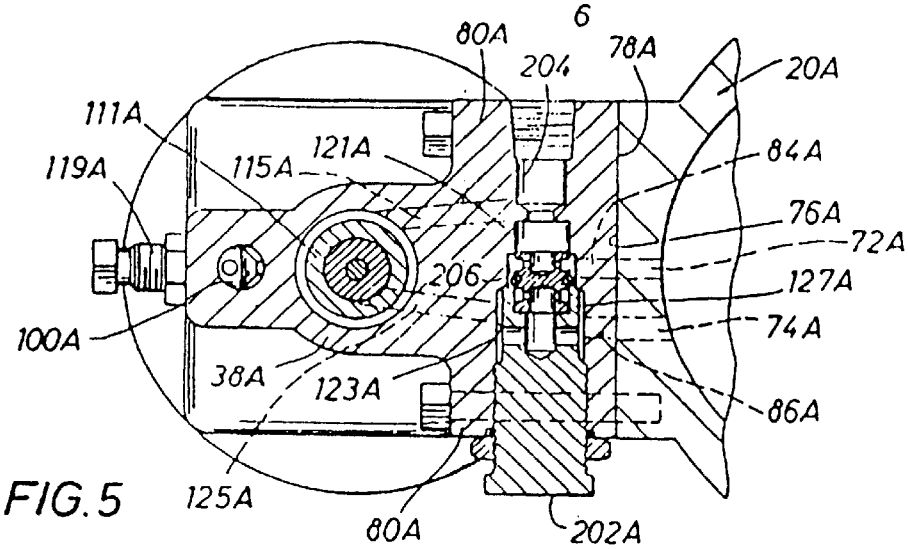

PILOT OPERATED SAFETY RELIEF VALVE

CROSS REFERENCE TO RELATED APPLICATIONS

This application claims the benefit of provisional application Ser. No. 60/035,952 filed Jan. 22, 1997 and entitled "Pilot Operated Valve Having Integral Pressure Pickup". This application is a continuation in part of application Ser. No. 08/701,830 filed Aug. 23, 1996 and entitled "Pilot Operated Safety Relief Valve".

BACKGROUND OF THE INVENTION

This invention relates to a pilot operated safety relief valve in a safety relief system for a pressure vessel, and more particularly to such a pilot operated safety relief valve having a main safety relief valve mounted on the pressure vessel and an associated pilot valve connected to the main safety relief valve.

DESCRIPTION OF THE PRIOR ART

Heretofore, pilot operated safety relief valves have been provided in safety relief systems. The main safety relief valve normally has a dome chamber over the main valve member. The pilot valve is mounted adjacent the main safety relief valve normally with three separate tubing or piping lines extending between the body for the main safety relief valve and the body for the pilot valve. Such lines include (1) a fluid inlet sensing line, (2) a dome line; and (3) an exhaust line. The fluid inlet sensing line extends between the fluid inlet of the main pressure relief valve and the fluid inlet for the pilot valve to communicate inlet fluid pressure to the pilot valve member for continuously sensing the inlet fluid pressure. The dome line extends between the dome chamber through the exhaust line for the main valve member and the pilot valve member for selectively venting the dome chamber upon actuation of the pilot valve member. The exhaust line normally extends between the pilot valve member and the fluid outlet for the main safety valve. Each of the tubing lines includes a separate length of external tubing extending between ports in the body of the main relief valve and the body of the pilot valve. Removable fittings at opposed ends of the tubing connect the tubing to the associated ports. The utilization of such external tubing lines provides for possible leaks and exposes the tubing to possible damage. Also, particularly due to vibrations of the pressure vessel, a resonance may occur in the tubing lines between the main valve body and the pilot valve body. Such vibrations create a problem particularly in certain installations where large vibrations occur and result in tubing cracks or breaks which cause the discharge of lading fluids as well as changes in the set pressure of the pilot valve.

A typical prior art pilot operated safety relief valve is shown in U.S. Pat. No. 4,848,397 dated Jul. 18, 1989 in which a pilot valve is mounted on a support angle connected to the body of the main safety relief valve. Three separate external tubing lines extend between ports in the body of the pilot valve and ports in the body of the main safety relief valve comprising a fluid inlet sensing line, a dome line, and an exhaust line. The main valve member is a piston valve member, and the dome chamber is positioned over the piston valve member. Vibrations from the pressure vessel would likewise result in vibrations and a possible resonance in the tubing lines between the pilot valve and main safety relief valve.

Heretofore, a separate source of test fluid with a separate inlet in communication with the fluid inlet passage to the pilot valve has been provided for testing the pilot valve for actuation at the set pressure. Normally, the fluid inlet pressure line to the pilot valve from the pressure vessel is blocked by a check valve during testing of the pilot valve. Thus, the pilot valve is not responsive to the fluid pressure in the pressure vessel during such testing.

SUMMARY OF THE INVENTION

The present invention is embodied in a pilot operated safety relief valve assembly in a safety relief system for a pressure vessel including a pilot valve mounted on a main safety relief valve. The body of the pilot valve is mounted directly on the body of the main safety relief valve in face to face contact. The body of the main relief valve has a planar mounting face; the body of the pilot valve has a matching planar mounting face. The two matching faces are secured to each other in contacting relation by suitable securing means, such as bolts. Axially aligned dome ports or passages in the faces of the pilot valve body and main relief valve body are in fluid communication with the dome chamber over the main relief valve member which normally comprises a piston. Likewise, axially aligned exhaust or vent ports in the opposed faces of the pilot valve body and main relief valve body are in fluid communication with the outlet passage for the main valve member for venting of the dome chamber. Separate tubing or piping between dome ports on the pilot valve and main relief valve and separate tubing or piping between exhaust ports of the pilot valve and main relief valve are eliminated in all of the embodiments of the present invention. In some embodiments, separate tubing or piping is also eliminated between the inlet ports of the pilot valve and main relief valve.

A series of various pilot valves each having a similar mounting face may be mounted on the mounting face of the main relief valve. Likewise, various main relief valves each having a similar mounting face for the pilot valve may be utilized. Thus, no adaptors are required between the pilot valve and the main relief valve. As a result of eliminating the tubing or piping between the pilot valve and main relief valve, the assembly and fitting time for assembling the safety relief system is minimized as well as the time required for repairs and replacements. Also, because the tubing and fittings are eliminated, damage and tampering to the safety system is minimized.

Another feature of the invention includes a "back flow preventer" valve and comprises a shuttle check valve member for the pilot valve. The shuttle check valve senses the higher of the pilot dome pressure or main valve body pressure and selectively applies the higher pressure to the dome chamber of the main relief valve. Such a back flow preventer valve prevents the main piston valve member from opening when the main valve discharge pressure is higher than the inlet pressure in order to block any outlet pressure from flowing through the main valve and/or pilot valve to the inlet. Since the back flow preventer is mounted within the body of the pilot valve, external connections, such as tubing, to the main valve body or pilot are not required.

A further feature of the invention includes an inlet fitting which has a pressure pickup tube extending into the inlet passage of the main relief valve from the pressure vessel to stagnate the velocity head and communicate total fluid pressure to the sensing member. Thus, inlet fluid pressure from the inlet passage is communicated to the sensing member thereby to provide a relatively quick response of the pilot valve to changes in inlet fluid pressure. The inlet pressure fitting also includes a field test connection so that a separate fluid source may be provided to the sensing member for testing of the pilot valve while maintaining the pilot valve responsive to inlet fluid pressure from the pressure vessel.

It is an object of this invention to provide a pilot operated safety relief valve in which separate tubing lines for the dome chamber and separate lines for the vent or exhaust between the pilot valve and the main relief valve are eliminated.

Another object of this invention is to provide such a pilot operated safety relief valve in which separate tubing or piping lines between the inlet for the main valve and the inlet for the pilot valve are eliminated.

It is a further object of this invention to provide such a pilot operated safety relief valve in which a back flow preventer or check valve is provided in the pilot valve body to sense the higher of the pilot inlet pressure or the main valve discharge pressure for selectively applying the higher pressure to the dome chamber of the main relief valve in order to prevent the main valve member from opening when the main valve discharge pressure is higher than the pilot inlet pressure.

A further object of the invention is the provision of such a pilot operated safety relief valve which includes an inlet fitting in which inlet fluid pressure from the inlet passage of the main relief valve is communicated to the sensing member of the pilot valve to provide a relatively quick response to changes in inlet fluid pressure including a field test connection for the inlet fitting which provides a separate fluid test source to the pilot sensing member for testing of the pilot valve while permitting inlet fluid from the pressure vessel to override the test fluid for actuation of the pilot valve during testing from inlet fluid.

Other objects, features, and advantages of the invention will be apparent from the following drawings and specification.

BRIEF DESCRIPTION OF THE DRAWINGS

FIG. 4 is a sectional view of another embodiment of a pilot valve and illustrating a back flow preventer valve to prevent the main piston valve member from opening when the main valve discharge pressure is higher than the pilot inlet pressure;

FIG. 5 is a section taken generally along line 5—5 of FIG. 4 which further shows the back flow preventer valve with FIGS. 5A and 5B illustrating the back flow preventer in open and closed positions;

FIG. 6 is an elevational view looking generally along line 6—6 of FIG. 4;

EMBODIMENTS OF FIGS. 1–3

Figure 1:
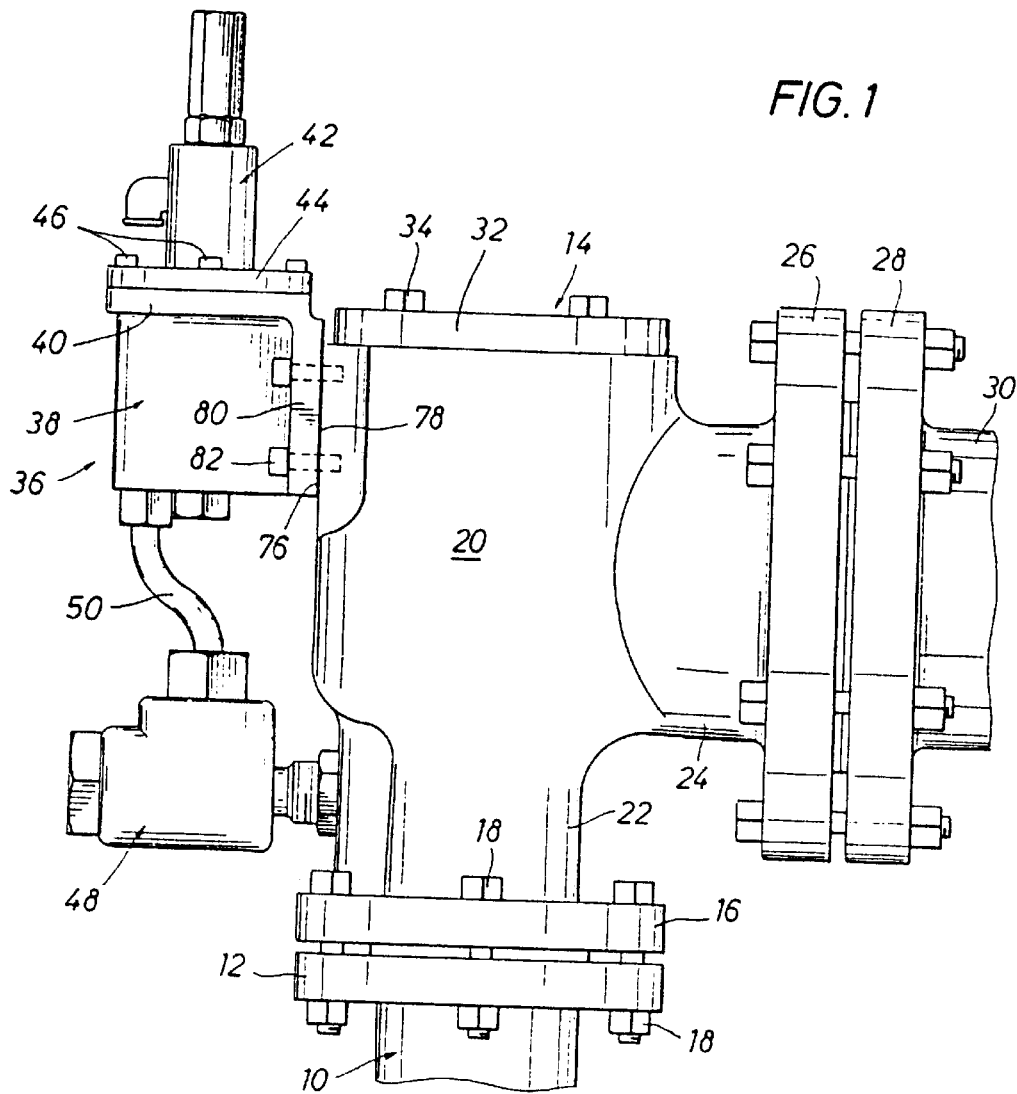
FIG. 1 is a side elevational view of the safety relief valve assembly of one embodiment of the present invention including a main safety relief valve and associated pilot valve connected thereto in a safety relief system for a pressure vessel.
Figure 2:
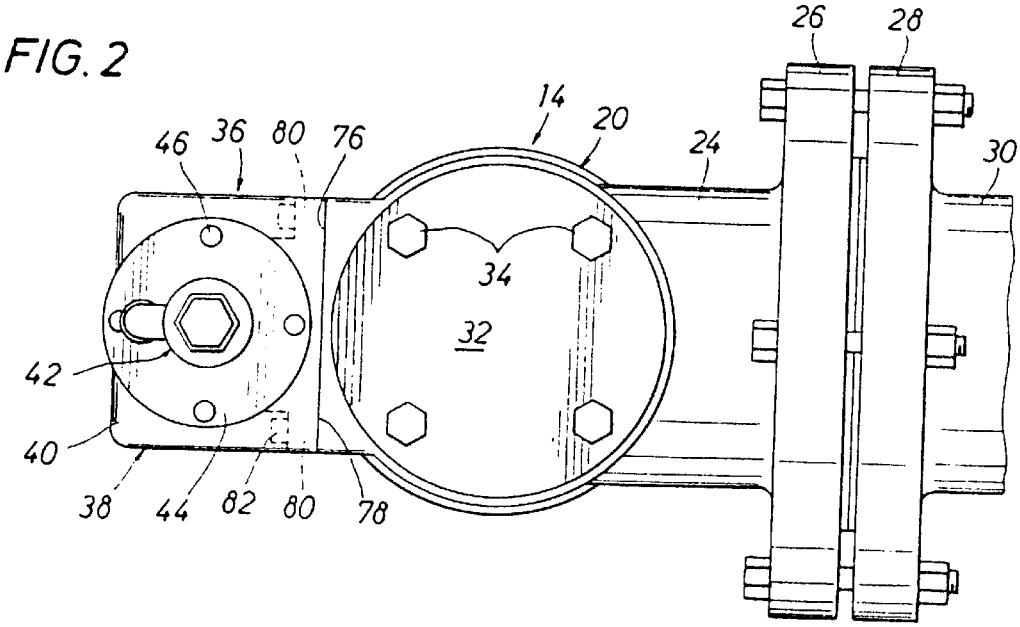
FIG. 2 is a top plan view of the main relief valve and associated pilot valve shown in FIG. 1.
Figure 3:
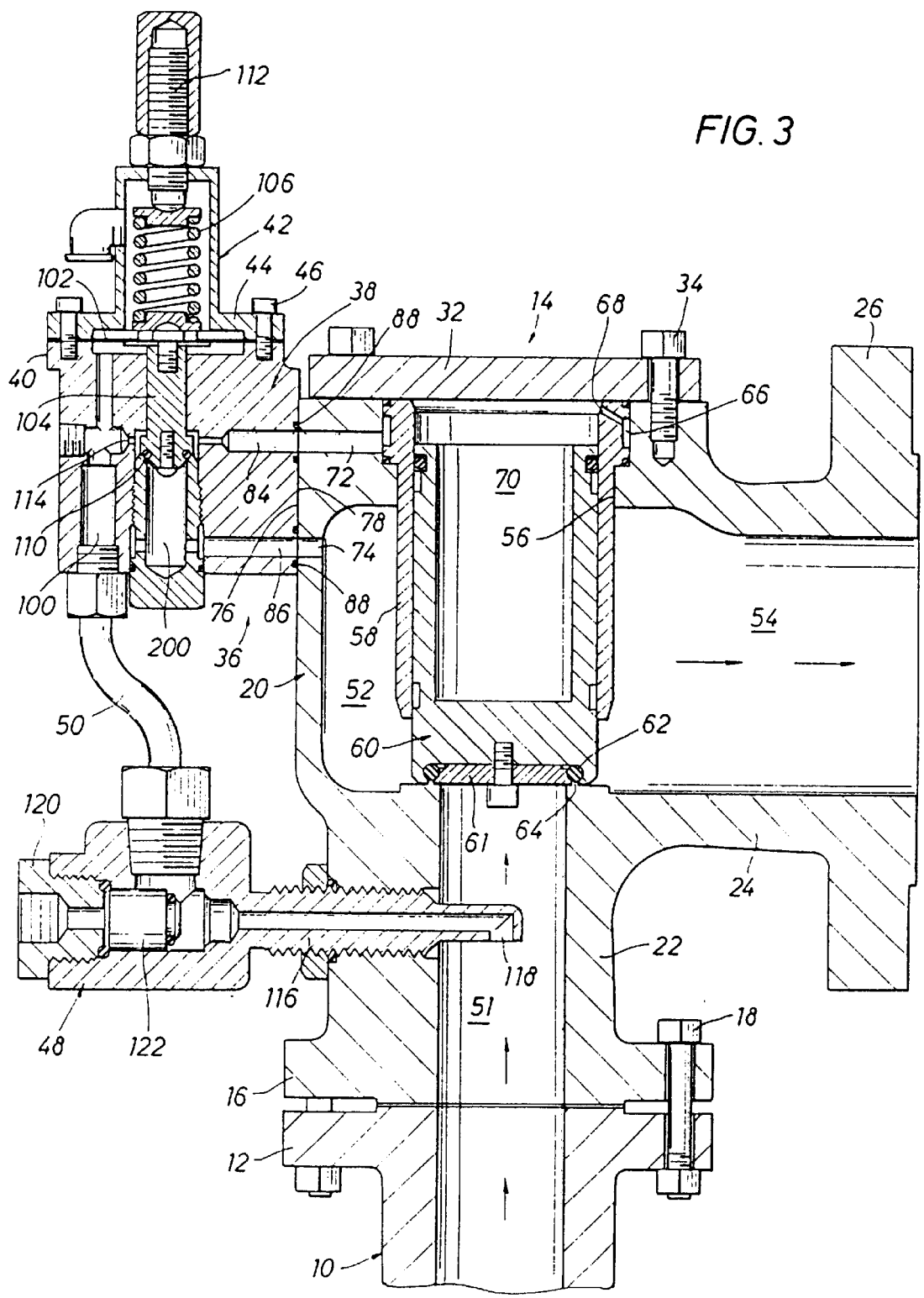
FIG. 3 is an enlarged sectional view of the main safety relief valve and associated pilot valve shown in FIGS. 1 and 2, for illustrating the main relief valve in normal operating condition with the main relief valve member in a closed position blocking flow from the pressure vessel.

Referring now to the drawings for a better understanding of this invention, and more particularly to the embodiment shown in FIGS. 1–3, a pilot operated safety relief valve assembly is illustrated in a safety relief system, including a pressure vessel or tank or line having an inlet generally indicated at 10 with a flange 12 thereon. A main relief valve is shown generally at 14 having a lower flange 16 connected to upper flange 12 of the pressure vessel by suitable nut and bolt combinations shown at 18. Relief valve 14 has a main body 20 including an inlet 22 and an outlet 24. Outlet 24 has a flange 26 connected to flange 28 (FIGS. 1, 2) of an outlet line 30. An upper cover plate 32 is secured to body 20 by suitable bolts 34.

A pilot valve is shown generally at 36 including a body generally indicated at 38 having an upper flange 40. A bonnet 42 has a lower flange 44 secured to flange 40 by suitable threaded studs 46. An inlet pressure fitting is indicated generally at 48 and has an inlet tubing line 50 extending therefrom to pilot valve 36.

Referring now particularly to FIG. 3, main relief valve 14 has an inlet flow passage 51 leading to a main body chamber 52. An outlet passage 54 extends from main body chamber 52. Body 20 has an upper access opening or bore 56 adjacent cover plate 32. A generally cylindrical sleeve or liner 58 is received within opening 54 and extends downwardly in main valve chamber 52. A piston valve member 60 has a lower seal retainer 61 securing an elastomeric O-ring 62 for sealing against a fixed metal seat 64 about inlet passage 51. Plastic (for example of Teflon™) seal/seat arrangements may be advantageous for certain main valves 14. Sleeve 58 has an upper outer annular groove at 66. A connecting port 68 provides fluid communication with a dome chamber 70 defined by sleeve 58 and piston valve member 60. A dome port 72 in fluid communication with annular groove 66 extends through the wall of main valve body 20. An exhaust or vent port 74 extends through the wall of body 20 to main valve chamber 52 to permit the discharge of fluid through outlet passage 54 and outlet line 30 (FIG. 1). As will be described below, main valve discharge fluid of main valve 14 is provided to the pilot valve 36 and a back flow preventer or check valve must be provided to prevent the main valve member 60 from opening when the discharge pressure is higher than the pilot inlet pressure.

Main valve body 20 has an outer planar mounting face 76 through which dome port 72 and exhaust port 74 extend. Body 38 of pilot valve 36 has an outer planar mounting face 78 in opposed relation to face 76. Side mounting flanges 80 adjacent mounting face 78, as shown particularly in FIGS. 1 and 2, receive bolts 82 to secure opposed mounting faces 76 and 78 to each other in contacting relation. Pilot valve body 38 has a dome port 84 and an exhaust port 86 in axial alignment with respective dome port 72 and exhaust port 74 in main valve body 20. Elastomeric O-rings 88 fit between faces 76 and 78 about the aligned dome ports or passages 72, 84 and the aligned exhaust ports or passages 74, 86.

Pilot valve 36 has a fluid inlet passage 100 extending to a fluid inlet sensing diaphragm 102 which is secured to a spindle valve member 104. A spring 106 forces valve member 104 into a seated position on seat 110. The compression of spring 106 may be adjusted by a suitable adjusting screw 112. An orifice 114 from inlet passage 100 is in fluid communication with dome chamber 70 through dome ports 72 and 84. Thus, inlet fluid pressure from inlet passage 100 pressurizes dome chamber 70 in the closed position of main valve member 60. Inlet pressure of inlet 51 faces a downwardly facing lower effective area below valve member 61 which is less than the inlet pressure (via lines 50, orifice 114 and ports 84, 72, grooves 66, 68) which faces upwardly facing upper effective area of piston 60. Accordingly, main valve 60 remains closed as long as inlet pressure is communicated to dome chamber 70.

As shown in FIG. 3, an inlet pressure fitting 48 has an externally threaded inlet pressure pickup tube 116 threaded within an internally threaded side port in the wall of inlet 22. Inlet tube 116 extends into inlet passage 50 and has an end sensing port 118 directed toward the pressure vessel to sense the inlet fluid pressure from outlet 10 of the pressure vessel. A field test fluid connection indicated at 120 is combined with inlet pressure fitting 48. A shuttle check valve member 122 is mounted within fitting 48 for movement between one position for blocking fluid communication from inlet tube 116 and another position for blocking fluid communication from test fitting 120. Test fluid from a separate fluid source (not shown) is removably threaded within fitting 120 to provide test fluid to inlet passage 100 and sensing diaphragm 102 to test pilot valve 36 for actuation at the set pressure. In the event fluid pressure from inlet passage 51 increases beyond the set pressure of pilot valve 36 during testing of pilot valve 36, shuttle valve member 122 is moved by the inlet fluid pressure to a position blocking the test fluid as shown in FIG. 3 and permitting opening of the main relief valve member 60.

OPERATION OF EMBODIMENT OF FIGS. 1–3

Upon an increase in fluid pressure in outlet 10 of the pressure vessel or line beyond the set pressure of pilot valve 36, the fluid pressure is sensed by sensing port 118 and communicated through inlet tubing 50 and inlet passage 100 to sensing diaphragm 102. Upward movement of diaphragm 102 lifts valve member 104 to provide fluid communication via aligned dome ports 72, 84, passage 200 and exhaust ports 86, 74 to vent dome chamber 70 to the exhaust chamber 52. Flow through the orifices of the pilot causes rapid pressure drop of the pilot valve 36 while it is open. The rapid pressure drop causes dome 70 pressure to drop rapidly. A decrease in fluid pressure in dome chamber 70 in combination with an increase in fluid pressure in inlet passage 51 causes main piston valve member 60 to open rapidly and provide fluid communication between inlet passage 51 and outlet passage 54 for relief of the fluid pressure in outlet 10 and the associated pressure vessel or line. After fluid pressure in fluid passage 51 is reduced below the set fluid pressure, valve member 104 reseats to block the venting of dome chamber 70 through exhaust ports 86 and 74. Fluid inlet pressure from inlet passage 100 through orifice 114 and dome ports 84, 72 repressurizes dome chamber 70 to increase the fluid pressure in dome chamber 70 thereby causing main piston valve member 60 to close with seating of O-ring 62 on fixed seat 64.

The arrangement of FIGS. 1–3 permits pilot valve 36 to be mounted directly on main relief valve 14 by securing opposed mating mounting faces 76 and 78 in face to face relation to each other thereby eliminating any external tubing or piping for dome and exhaust lines between the main relief valve 14 and pilot valve 36. Also, an inlet fitting is provided to sense fluid inlet pressure from the center of the passage from the pressure vessel or line 10 while also providing for the separate testing of the pilot valve from a separate test fluid applied through the inlet pressure fitting. If an abnormally high fluid pressure is obtained in the pressure vessel or line 10 during the field test operation, pilot valve 36 will be actuated in the normal manner. Pilot valve 36 is an unbalanced modulating pilot valve with a set pressure determined by inlet pressure acting on sensing diaphragm 102 which generates a lifting force opposed by the spring bias of spring 106. The size of orifice 114 is predetermined dependent primarily on the desired operation of piston valve member 60.

EMBODIMENT OF FIGS. 4–6

Referring now to FIGS. 4–6, a modified pilot valve is shown generally at 36A having a planar mounting face 78A secured by mounting bolts 82A against planar mounting face 76A of main valve body 20A of main relief valve 14A. Dome ports 72A and 84A and exhaust ports 74A and 86A are axially aligned as in the embodiment shown in FIGS. 1–3. An inlet passage 100A communicates inlet fluid pressure to diaphragm 102A secured to spindle 104A which is normally seated on O-ring 105A on fixed spool 111A.

A balancing piston 103A is connected to spindle valve 104A by a compression rod 102A. Inlet fluid pressure beneath piston 103A assists in unseating of spindle valve 104A when the set pressure of pilot valve 36A is exceeded. Fixed spool 111A has an outer annular groove 113A and ports 112A to the central bore thereof. An orifice 114A from inlet passage 100A provides inlet fluid through passage 115A and dome passage 84A to the dome chamber of the main relief valve through dome passage 72A. Passage 115A communicates with passage 84A when the back flow preventer valve 121A is in the position shown in FIGS. 5 and 6 as described below in more detail. A manually operated adjusting screw 119A permits manual adjustment of the size of orifice 114A to control the inlet fluid flow to the dome chamber.

Incorporated in body 38A of pilot valve 36A is a back flow preventer comprising a piston shuttle valve 121A mounted for sliding movement within bores 204A and 206A of body 38A. Passage 115A communicates with dome passage 84A during normal operations where dome pressure is greater than main valve exhaust pressure. Dome passage 84A extends from bore 206 to bore 204 via a hole 122A of shuttle valve 121A when it is in the position of normal operation of FIG. 5. Exhaust port 86A is closed from direct communication with dome port 84A because O-ring 140A is seated on seat 142A of bore 206.

Exhaust passage 125A is in fluid communication with exhaust port 86A. Inlet fluid from inlet passage 100A is exhausted to main valve exhaust chamber 52A upon opening of pilot valve member 104A through auxiliary exhaust passages 125A and 127A and exhaust passage 86A. Piston shuttle valve 121A in the position shown in FIGS. 5 and 6, blocks flow between dome passage 84A and branch exhaust passage 127A to exhaust passage 86A. The dome chamber for the main relief valve member when below the set pressure of pilot valve 36A is in fluid communication with inlet passage 100A through dome passage 84A, port 115A, ports 112A and orifice 114A.

OPERATION OF EMBODIMENT OF FIGS. 4-6

With an increase of fluid pressure in inlet fluid passage 100A at the set pressure, diaphragm 102A is moved upwardly along with spindle valve 104A to provide for the exhaust of inlet fluid from inlet fluid passage 100A through orifice 114A, branch exhaust passages 125A and 127A and exhaust port 86A to main exhaust valve chamber 52A. The dome pressure in the dome chamber upon opening of spindle valve 104A is vented through port 115A, ports 112A, branch exhaust passages 125A and 127A, and exhaust passage 86A thereby reducing dome pressure to permit opening of the main relief valve member. When the dome pressure is greater than the discharge pressure, the shuttle valve member 121A remains in the position shown in FIGS. 5 and 6 to require fluid flow from the dome chamber through branch exhaust ports 125A and 127A to exhaust port 86A. See especially FIG. 5A. When fluid pressure in fluid inlet passage 100A decreases below the set pressure, spindle valve 104A reseats, and inlet fluid pressure is applied through orifice 114A and port 115A to dome passage 84A to repressurize the dome chamber 70 to provide closing of the main valve member as in the embodiment of FIGS. 1–3.

During normal operation, the inlet fluid pressure in fluid inlet passage 100A is greater than the fluid pressure in the main valve exhaust chamber 52A. Thus, piston shuttle valve 121A remains in the position of FIGS. 5 and 6 blocking direct communication between dome port 84A and exhaust port 86A.

If the discharge or outlet fluid pressure in main valve exhaust chamber 52A increases to an amount greater than inlet fluid pressure in flow passage 100A (and in passage 115A), shuttle valve member 121A is moved to an opposed end position from the position shown in FIGS. 5 and 6. See FIG. 5B. As a result, direct communication of outlet fluid pressure from valve exhaust chamber 52A via port 86A is provided to dome port 84A via branch exhaust ports 127A and holes 150A in shuttle valve 121A thereby increasing the fluid dome pressure in the dome chamber 70 to maintain the main valve member in a closed position as long as an outlet fluid pressure is greater than the inlet fluid pressure in the pressure vessel. Simultaneously, communication between port 84A and passage 115A is blocked, because O-ring seat 123A closes against seat 144A. This state of shuttle valve 121A prevents fluid from flowing in a reverse direction from the exhaust chamber of the main relief valve through the pilot valve into the pressure vessel 10. Likewise, the discharge pressure is prevented from flowing via passage 115A back into the inlet passage 100A of the pilot valve 36A. Thus, shuttle valve member 121A forms a back flow preventer.

EMBODIMENT OF FIG. 7

Figure 7:
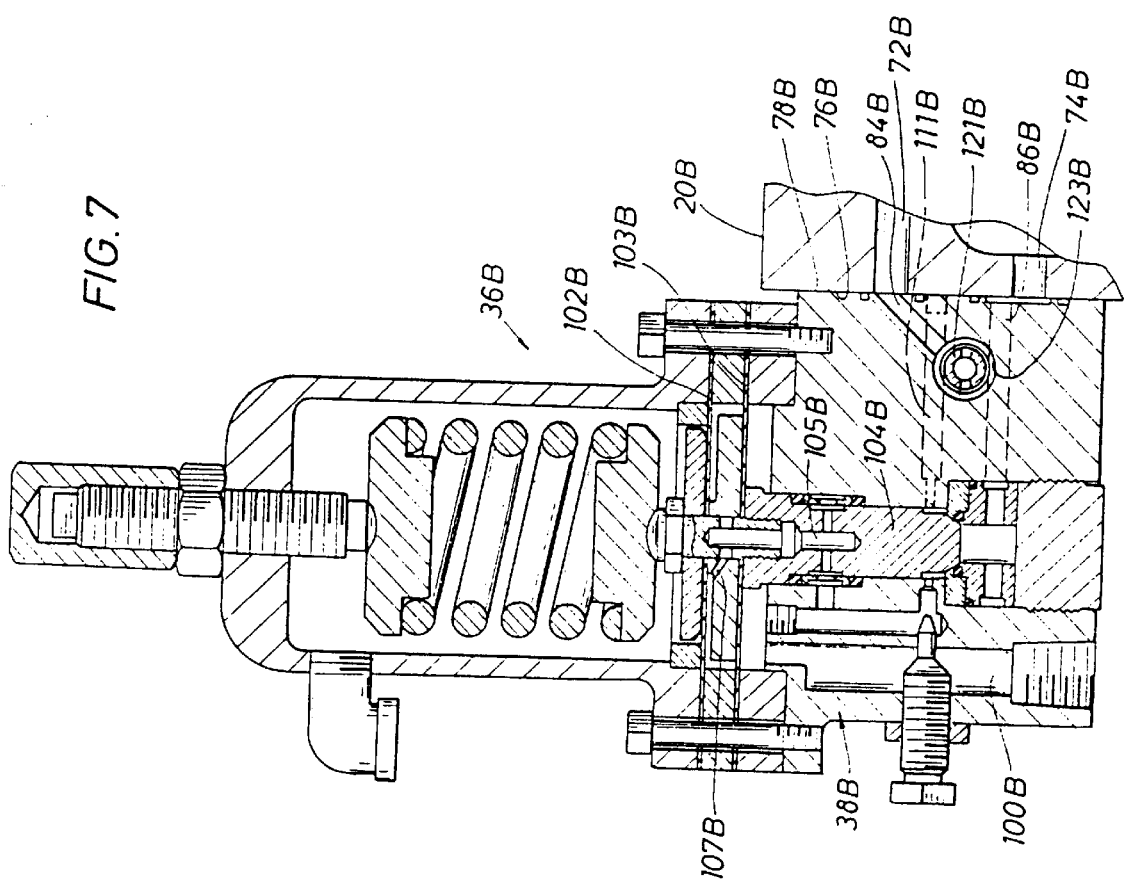
FIG. 7 is a sectional view of a further modification of a pilot valve mounted on an associated main relief valve with the pilot valve having dual sensing diaphragms.

Referring now to FIG. 7, a further embodiment of the invention is shown in which a modified pilot valve 36B is illustrated having dual diaphragms 102B and 103B. Diaphragm 103B is a boost diaphragm having a larger effective area than the sensing diaphragm 102B. Opposed planar faces 76B and 78B on main valve body 20B and pilot 20 valve 36B are secured to each other. A dome port is shown at 84B and an exhaust port is shown at 86B in pilot valve body 38B. Dome port 84B is aligned with dome passage 72B in main valve body 20B. Exhaust port 86B is in alignment with exhaust port 74B to main valve body 20B. A pilot valve member 104B is secured to diaphragms 102B and 103B. Fluid is supplied through ports 105B and 107B to boost diaphragm 102B.

A back flow shuttle valve 121B is mounted within a bore 123B in pilot valve body 38B. A branch exhaust passage 111B is in fluid communication with exhaust port 86B. Shuttle valve 121B functions in a manner similar to shuttle valve 121A in the embodiment shown in FIGS. 4–6.

EMBODIMENT OF FIG. 8

Figure 8:
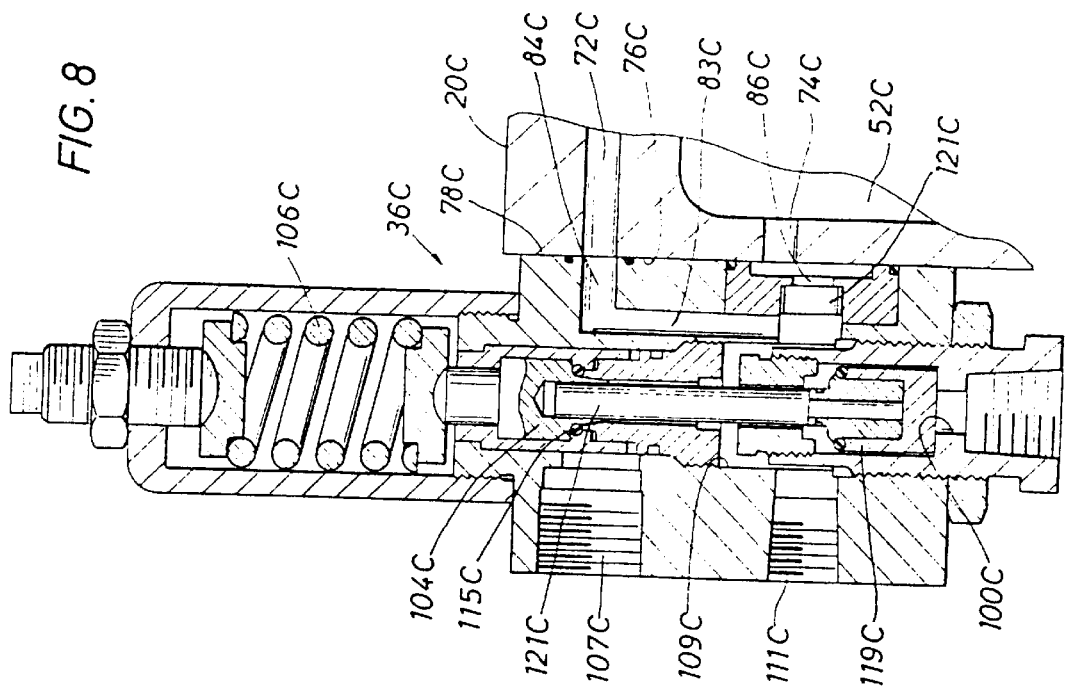
FIG. 8 is a sectional view of an additional embodiment of a pilot valve shown mounted directly on an adjacent main relief valve and having an exhaust port to atmosphere.

Referring now to FIG. 8, another embodiment of the invention is shown in which a modified pilot valve 36C having a body 38C with a planar face 78C is connected in opposed relation to planar face 76C of main valve body 20C as in the other embodiments. A dome port 84C and an exhaust port 86C are also provided for alignment with mating ports 72C and 74C in main valve body 20C. Main valve chamber 52C communicates with exhaust port 74C. Inlet fluid in inlet passage 110C acts against a lower piston valve member 119C which is in contact with a push rod 121C to upper valve member 104C. Spring 106C biases valve member 104C to a closed position. Loosely fitting push rod 121C has a small annular clearance about its outer periphery to permit a limited fluid flow. Likewise, piston valve member 119C permits a limited fluid flow about its periphery. Inlet fluid from inlet passage 110C flow about valve member 119C to flow passage 83C and dome port 84C to pressurize the dome chamber. A main exhaust port 107C to atmosphere extends to a central bore 109C in piston valve body 38C. An upper pop seat 115C is controlled by push rod 121C and actuation of piston member 104C. Pilot valve 36C has manual blowdown port at 111C. Upon opening of valve member 104C, fluid from the dome chamber is exhausted to atmosphere through exhaust port 107C.

A back flow shuttle check valve 121C is mounted within exhaust port 86C and blocks fluid flow between dome port 84C and exhaust port 86C at all times except when the outlet fluid pressure in main valve chamber 52C is greater than the inlet fluid pressure in inlet passage 110C. When outlet fluid pressure in valve chamber 52C is greater than fluid pressure in inlet passage 110C, shuttle valve 121C moves to a position to provide fluid communication between dome port 84C and exhaust port 86C thereby to increase the fluid pressure in the dome chamber and prevent opening of the main valve.

EMBODIMENT OF FIG. 9

Figure 9:
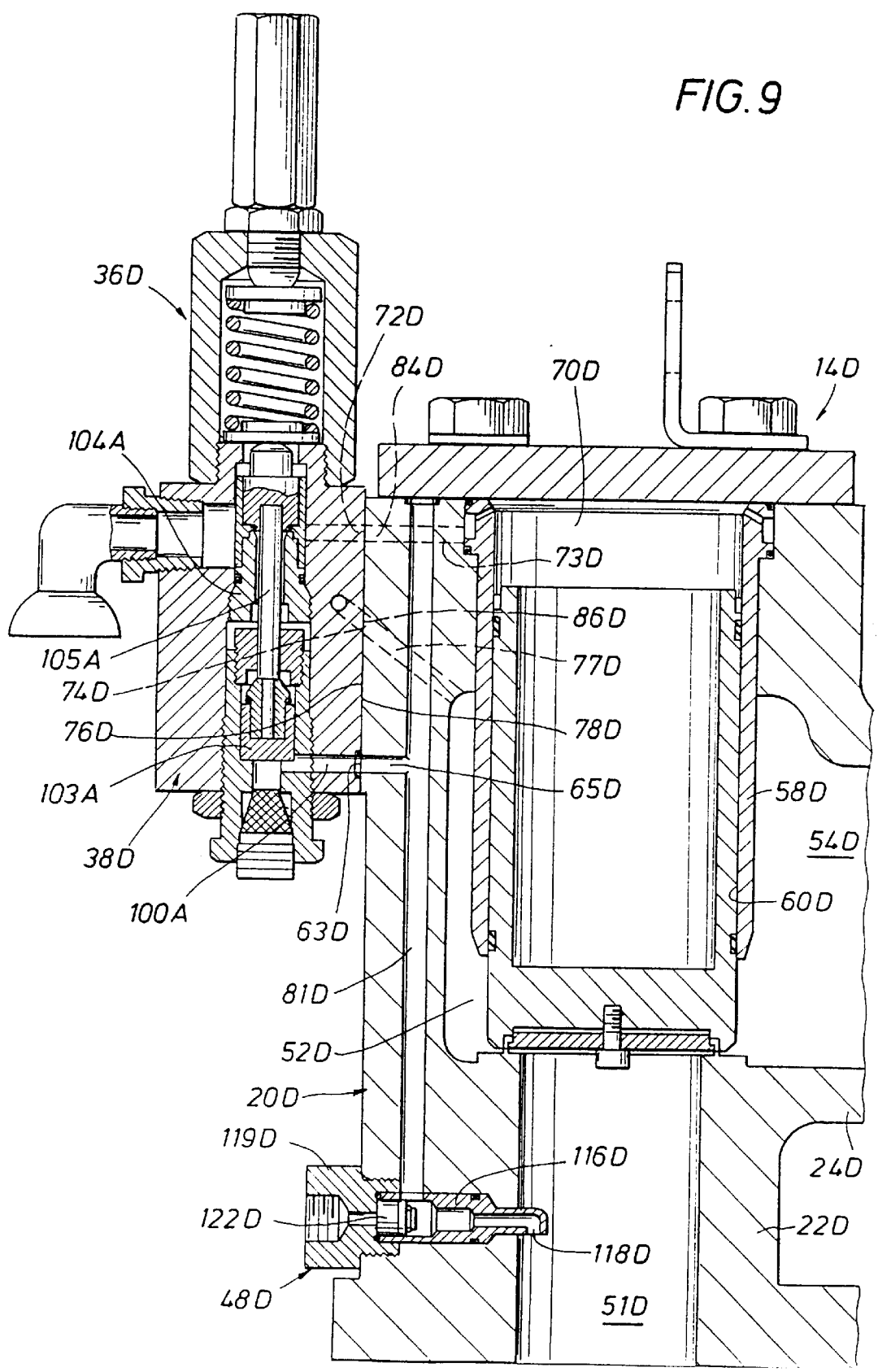
FIG. 9 is a sectional view of another embodiment of the invention showing a main safety relief valve and pilot valve connected thereto along opposed matching planar faces with an axial fluid inlet passage formed in the main valve body for communication with the pilot valve.

The embodiment shown in FIG. 9 in addition to eliminating tubing between the pilot valve and safety relief valve for the dome chamber and the exhaust lines also eliminates any piping or tubing between the pilot valve and main safety relief valve for the fluid inlet sensing line. The pilot valve body has a fluid inlet sensing port in its planar face in axial alignment with a mating fluid inlet sensing port in the matching planar face of the main valve body. The inlet of the main valve body has a fluid sensing or pickup port thereat below the main valve member and an inlet fluid passage extends from the pickup port at the inlet to the inlet sensing port in the planar face of the main valve body for communicating fluid inlet pressure to the pilot valve.

Referring now particularly to FIG. 9, the main safety relief valve is shown generally at 14D and a pilot valve shown generally at 36D. The main safety relief valve 14D includes a body 20D with an integral hub for connection to a suitable flow line (not shown) forming an outlet 24D. An inlet 22D in body 20D defines an inlet passage 51D in continuous fluid communication with the pressure vessel, line or tank connected thereto (not shown). Outlet 24D defines an outlet passage 54D. A main valve chamber 52D is provided between inlet passage 51D and outlet passage 54D. A main piston valve member 60D is mounted within main valve chamber 52D. A dome chamber 70D is defined over main piston valve member 60D. Main valve member 60D is exposed to fluid inlet pressure from inlet passage 51D and is mounted within an outer liner 58D for reciprocating movement. Main valve body 20D has a planar mounting face 76D.

Pilot valve 36D has a body 38D with an opposed planar mounting face 78D to matching planar mounting face 76D. A flange (not shown) on pilot valve body 38D is bolted to face 76D to secure faces 76D and 78D to each other in contacting relation. Planar mounting face 76D on main valve body 20D has a dome port 72D, an exhaust port 74D and a fluid inlet sensing port 75D. Planar mounting face 78D on pilot valve 42D has a dome port 84D, an exhaust port 86D, and fluid inlet sensing port 65D communicating with and in alignment with respective ports 72D, 74D and 75D on the main valve body 38D. A dome fluid passage 73D extends from ports 72D, 84D to dome chamber 70D. An exhaust fluid passage 77D extends from ports 74D, 86D to valve chamber 52D.

Fluid inlet sensing ports 63D and 65D are positioned in respective planar faces 76D and 78D of valve body 20D and pilot valve body 38D. Planar faces 76D and 78D are in face to face contact with each other without any separate tubing or piping therebetween. An inlet pressure fitting shown generally at 48D has an externally threaded inlet pressure pickup tube 116D threaded within an internally threaded lateral port in the wall of inlet 22D. Inlet tube 116D has an end sensing port 118D directed toward the pressure vessel to sense inlet fluid pressure from the outlet of the pressure vessel. A shuttle check valve member 122D is mounted within fitting 48D for movement between one position for blocking fluid communication from inlet tube 116D (during testing) and another position for blocking fluid communication from a test fitting 119D (during normal operation). A fitting for test fluid from a separate fluid source (not shown) may be threaded within test fitting 119D to provide test fluid for pilot valve 36D.

An axial inlet fluid passage 81D extends from inlet pickup tube 116D to sensing port 63D to communicate inlet fluid pressure from inlet pickup port 118D to pilot valve 36D. Fluid passage 81D may be drilled in main valve body 20D and cross port 63D connected thereto.

Pilot valve 36D has a balancing piston 103D connected to a spindle valve 104D by a connecting rod 108D. An inlet fluid passage 100D in pilot valve body 38D extends from port 65D to a chamber beneath piston 103D. Inlet fluid pressure communicated beneath piston 103D is effective to unseat spindle valve 104D when the set pressure of pilot valve 36D is exceeded. The operation of the pilot operated safety valve assembly of FIG. 9 is similar to the operation shown and described in the embodiment of FIG. 8.

EMBODIMENT OF FIG. 10

Figure 10:
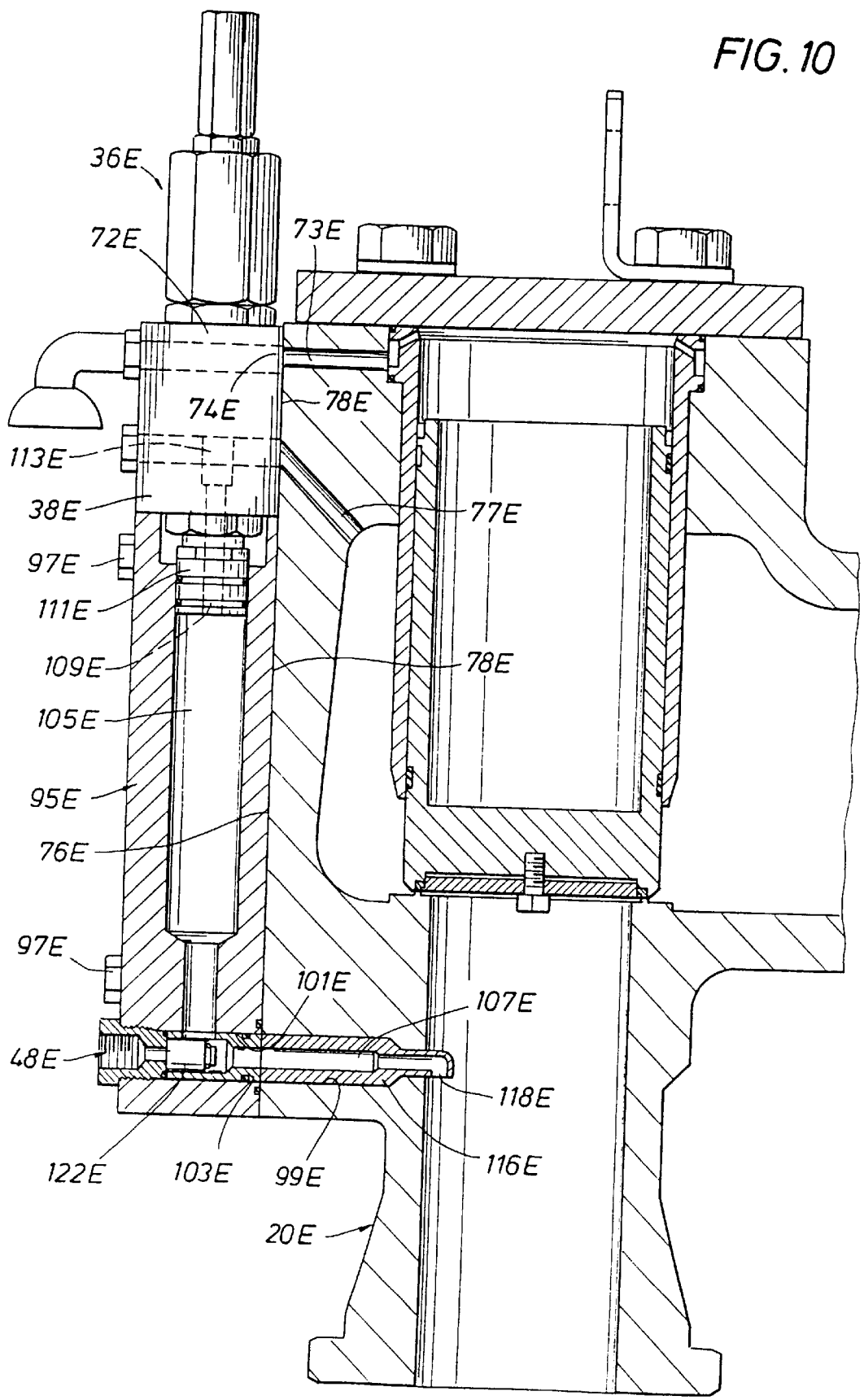
FIG. 10 is a sectional view of a further embodiment of the invention in which a separate housing having an inlet fluid passage is connected to the planar face of the main valve body with a laterally extending inlet flow passage in the main valve body extending between the inlet pickup port and the inlet fluid passage of the housing.

The embodiment of the invention shown in FIG. 10 shows a separate block or housing at 95E mounted beneath pilot valve body 38E. Housing 95E has a planar face which is a continuation of planar face 78E of pilot valve body 38E. Housing 95E is secured by bolts 97E against planar face 76E of main valve body 20E. Dome passage 73E and exhaust passage 77E in main valve body 20E define dome port 72E and exhaust port 74E. Inlet pressure fitting 48E has an inner pickup tube 116E mounted within a lateral bore or port 99E in the wall of main valve body 20E. Inlet tube 116E has an end sensing port 118E directed toward the pressure vessel. A separate aligned lateral bore or port 101E is provided in housing 95E. A sleeve 103E is positioned therein to receive shuttle check valve member 122E therein. An axial inlet flow passage 105E in housing 95E is in fluid communication with lateral flow inlet passage 107E disposed in inlet pressure fitting 48E. Inlet fluid passage 109E through an end plug 111E extends to the lower end of piston valve member 113E for actuation of pilot valve 36E as in the embodiment of FIGS. 1 and 2. Housing 95E with inlet pressure fitting 48E may be utilized as a retrofit for certain pilot valves such as shown in the embodiments of FIGS. 1–8 in which tubing or piping for the fluid inlet sensing line is provided between a main safety relief valve and pilot valve with planar mounting faces on the main valve body and pilot valve body. The operation of the embodiment shown in FIG. 10 is similar to the operation of the embodiment of FIG. 9.

From the above, the present invention has been described in which a plurality of various pilot valves may be mounted directly on a main relief valve body with opposed planar mounting surfaces in face to face relation to each other. As a result, aligned dome passages or ports and aligned exhaust passages or ports are provided in the body of the main relief valve and the body of the pilot valve to eliminate any separate tubing or piping between such passages. Also, the embodiments shown in FIGS. 9–10 provide inlet passages or ports in the body of the main relief valve and the body of the pilot valve without any tubing or piping therebetween. The embodiment of FIG. 10 has a separate block or housing for the inlet passage of the pilot valve. Thus, a common main relief valve may be provided to accommodate a variety of different types of pilot valves. Likewise, a plurality of various main relief valves each utilizing a common mounting face may be provided with various pilot valves. Further, the body of the pilot valve is provided with a back flow preventer valve member which selects the higher of the main valve inlet pressure or the outlet pressure for fluid communication with the dome chamber thereby preventing the main relief valve member from opening when the body or outlet pressure in the main relief valve is greater than the inlet fluid pressure from the pressure vessel. As the back flow preventer valve is provided in the pilot valve body, any external tubing is eliminated.

Additionally, a field test connection is combined with an inlet pressure pickup connection so that the pilot valve is responsive to inlet pressure from the pressure vessel during the testing of the pilot valve. Thus, upon a buildup in pressure in the pressure vessel while the pilot valve is being tested by a separate fluid source, the inlet fluid pressure will override the test fluid pressure and provide opening of the main valve member for relief of fluid pressure from the pressure vessel.

While preferred embodiments of the present invention have been illustrated in detail, modifications and adaptations of the preferred embodiments may occur to those skilled in the art. However, it is to be expressly understood that such modifications and adaptations are in the spirit and scope of the present invention as set forth in the following claims.

What is claimed is:

1. A pilot operated safety relief valve assembly comprising:
   a main relief valve including a main valve body having a main valve chamber an inlet flow passage extending axially from an inner end of said valve body to said main valve chamber and defining an annular valve seat about said inlet flow passage, and an outlet flow passage extending axially from one side of said valve body to said main valve chamber at right angles to said inlet flow passage;

said valve body having a generally planar outer end face in opposed relation to said inner end to define an outer end of said main valve chamber, and a generally planar side mounting face in opposed relation to said one side and said outlet flow passage;

a generally cylindrical main relief valve mounted in said valve chamber for reciprocal movement axially of said inlet flow passage and for seating on said annular valve seat with a dome chamber defined between said main relief valve and said planar outer end face;

a removable outer end cover plate mounted on said planar outer end face to permit removal of said main relief valve member from said planar outer end face upon removal of said cover plate, said cover plate having an inner planar face in mating contact with said planar outer end face of said valve body and forming an outer end of said dome chamber at said planar outer end face;

fasteners extending through said cover plate to said valve body to secure said inner planar face of said cover Plate to said planar outer end face of said body in mating face-to-face relation;

a pilot valve having a separate pilot valve body located entirely above said inlet flow passage and a pilot valve member mounted in said pilot valve body;

said pilot valve body having a planar side mounting face opposed in mating face to face contact with said planar side face on said valve body;

a dome passage from said pilot valve to said dome chamber extending through said opposed planar side mounting faces;

an exhaust passage from said pilot valve to said outlet flow passage extending through said opposed planar side mounting faces and said valve chamber for the exhaust of fluid from said dome chamber to said outlet flow passage upon the actuation of said pilot valve member;

an inlet sensing passage within said main valve body extending from said inlet flow passage to said pilot valve member for the actuation of said pilot valve member upon the reaching of a predetermined high fluid pressure in said inlet flow passage thereby to permit the exhaust of fluid from said dome chamber to said outlet flow passage through said opposed planar mounting faces;

a pickup tube extending within said inlet flow passage of said valve body, said inlet sensing Passage extending from said pickup tube axially of said valve body and then extending transversely of said valve body through said opposed planar side mounting faces to said pilot valve member; and means securing said pilot valve body to said main valve body with said opposed planar side mounting faces in face to face contact with each other.

2. A pilot operated safety relief valve assembly as set forth in claim 1 wherein:

said means securing said pilot valve body to said main valve body includes a pair of opposed side flanges on said pilot valve body forming a portion of said planar mounting face for said pilot valve, and fasteners connecting said side flanges to said main valve body.

3. A pilot operated safety relief valve assembly as set forth in claim 1 wherein said dome passage and said dome chamber in the closed position of said main relief valve member are in fluid communication with inlet fluid pressure which solely urges the main relief valve toward seated position without any separate spring means.

4. The pilot operated safety relief valve assembly as set forth in claim 1 wherein:

said main valve body has an inlet port to said inlet fluid passage, and said pickup tube is mounted within said inlet port and has an end portion extending within said inlet passage and directed toward a pressure vessel for communication of fluid pressure from said pressure vessel to said pilot valve.

5. The pilot operated safety relief valve as set forth in claim 4 wherein:

said pickup tube has a field test connection adapted to connect to an external test pressure source for testing of said pilot valve; and a shuttle valve is positioned between said field test connection and said inlet port to permit the higher of the pressures at the field test connection or inlet port to be communicated to said pilot valve so that said pilot valve is responsive to fluid pressure from said pressure vessel while said pilot valve is being tested from an external test pressure source.

6. A pilot operated safety relief valve assembly comprising:

a main relief valve including a main valve body having a main valve chamber, an inlet flow passage extending axially from an inner end of said valve body to said main valve chamber and defining an annular valve seat about said inlet flow passage, and an outlet flow passage extending axially from one side of said valve body to said main valve chamber at right angles to said inlet flow passage;

said valve body having a generally planar outer end face in opposed relation to said inner end to define an outer end of said main valve chamber, and a generally planar side mounting face in opposed relation to said one side and said outlet flow passage;

a generally cylindrical main relief valve mounted in said valve chamber for reciprocal movement axially of said inlet flow passage and for seating on said annular valve seat with a dome chamber defined between said main relief valve and said planar outer end face, a removable outer end cover plate mounted on said planar outer end face to permit removal of said main relief valve member from said planar outer end face upon removal of said cover plate, said cover plate forming an outer end of said dome chamber at said planar outer end face;

a pilot valve having a separate pilot valve body and a pilot valve member mounted in said pilot valve body;

said pilot valve body having a planar side mounting face opposed in mating face to face contact with said planar side face on said valve body;

a dome passage from said pilot valve to said dome chamber extending through said opposed planar side mounting faces;

an exhaust passage from said pilot valve to said outlet flow passage extending through said opposed planar side mounting faces and said valve chamber for the exhaust of fluid from said dome chamber to said outlet flow passage upon the actuation of said pilot valve member;

an inlet sensing passage from said inlet flow passage to said pilot valve member for the actuation of said pilot valve member upon the reaching of a predetermined high fluid pressure in said inlet flow passage thereby to permit the exhaust of fluid from said dome chamber to said outlet flow passage through said opposed planar mounting faces;

means securing said pilot valve body to said main valve body with said opposed planar side mounting faces in face to face contact with each other;

said pilot valve body having a bore (206A) therein in fluid communication with said dome fluid passage and said exhaust fluid passage; and a freely movable fluid pressure responsive back flow valve piston (121A) disposed within said bore (206A) for movement between two positions, said piston in one of said positions being responsive to fluid pressure from said dome chamber greater than fluid pressure in said outlet flow passage to prevent direct fluid communication between said dome passage and said exhaust passage, and in the other of said positions being responsive to fluid pressure in said outlet flow passage greater than fluid pressure in said dome passage to permit direct fluid communication between said dome passage and said valve chamber through said exhaust passage which extends through said opposed planar side mounting faces.

7. A pilot operated safety relief valve assembly as set forth in claim 6 wherein said dome passage and dome chamber in the closed position of said main relief valve member are in fluid communication with inlet fluid pressure which solely urges the main relief valve toward seated position without any separate spring means.

8. The pilot operated safety relief valve assembly as set forth in claim 5 wherein:

said main valve body has an inlet port fluid to said inlet passage, and an inlet pressure pickup fitting is mounted within said inlet port and has an end portion extending within said inlet passage and directed toward a pressure vessel for communication of fluid pressure from said pressure vessel to said pilot valve.

9. The pilot operated safety relief valve as set forth in claim 8 wherein:

said inlet fitting has a field test connection adapted to connect to an external test pressure source for testing of said pilot valve; and a shuttle valve is positioned between said field test connection and said inlet port to permit the higher of the pressures at the field test connection or inlet port to be communicated to said pilot valve so that said pilot valve is responsive to fluid pressure from said pressure vessel while said pilot valve is being tested from an external test pressure source.

10. A pilot operated safety relief valve assembly as set forth in claim 6 wherein said cover plate has an inner planar face in mating contact with said planar outer end face of said valve body; and fasteners extend through said cover plate to said valve body to secure said inner planar face of said cover plate to said planar outer end face of said valve body in mating face-to-face relation.

11. A pilot operated safety relief valve assembly as set forth in claim 6 wherein:

said pilot valve body has a pair of adjacent body portions positioned in end to end relation for defining said planar mounting face for said pilot valve body, one of said body portions being positioned adjacent said main valve inlet and said inlet sensing passage extends through the planar mounting face on said one body portion.

* * * * *